(12) United States Patent
Huang

(10) Patent No.: US 10,348,873 B2
(45) Date of Patent: Jul. 9, 2019

(54) MEASURABLE MICRO-COMMUNICATION DEVICE

(71) Applicant: Dongguan Jianye Material Technology Co., Ltd., Dongguan (CN)

(72) Inventor: Limin Huang, Dongguan (CN)

(73) Assignee: DONGGUAN JIANYE MATERIAL TECHNOLOGY CO., LTD., Dongguan, Guangdong Province (CN)

( * ) Notice: Subject to any disclaimer, the term of this patent is extended or adjusted under 35 U.S.C. 154(b) by 0 days.

(21) Appl. No.: 15/715,390

(22) Filed: Sep. 26, 2017

(65) Prior Publication Data
US 2018/0020085 A1    Jan. 18, 2018

(30) Foreign Application Priority Data
Mar. 3, 2017   (CN) .......................... 2017 1 0124869

(51) Int. Cl.
| | | |
|---|---|---|
| *H04W 88/02* | (2009.01) | |
| *G06K 7/00* | (2006.01) | |
| *H04M 1/02* | (2006.01) | |
| *G01J 5/02* | (2006.01) | |
| *G01S 17/08* | (2006.01) | |
| *H04N 5/225* | (2006.01) | |

(52) U.S. Cl.
CPC ............. *H04M 1/0264* (2013.01); *G01J 5/02* (2013.01); *G01S 17/08* (2013.01); *H04N 5/2257* (2013.01); *H04M 2250/12* (2013.01)

(58) Field of Classification Search
CPC ..................................................... G06K 7/00
See application file for complete search history.

(56) References Cited

U.S. PATENT DOCUMENTS

| | | | | |
|---|---|---|---|---|
| 5,506,749 | A * | 4/1996 | Matsuda | G06F 1/1626 361/679.58 |
| 5,796,575 | A * | 8/1998 | Podwalny | G06F 1/1626 361/679.27 |
| 6,403,254 | B1 * | 6/2002 | Wang | H01M 2/1055 429/100 |
| 9,395,753 | B2 * | 7/2016 | Amano | G06F 1/1626 |
| 9,489,060 | B2 * | 11/2016 | Ashcraft | G06F 1/1626 |
| 9,672,400 | B2 * | 6/2017 | Kowalczyk | G06K 7/10831 |
| 2002/0101707 | A1 * | 8/2002 | Canova, Jr. | G06F 1/1626 361/679.56 |
| 2006/0072033 | A1 * | 4/2006 | Oran | H04N 5/2251 348/376 |

(Continued)

Primary Examiner — Cindy Trandai
(74) Attorney, Agent, or Firm — Cheng-Ju Chiang

(57) ABSTRACT

A measurable micro-communication device includes a main body, a camera and a measurement sensor, a display screen is provided at a front surface of the main body, and both the camera and the measurement sensor are configured at a top surface of the main body. Since the camera is configured at the top surface of the main body, thus if the measurable micro-communication device is lain on flat position, user can also take pictures by using the camera, without picking up the device. Thus the camera operation is more convenient. Furthermore, since the measurement sensor is configured at the top surface of the main body, by which distance and temperature can be measured, thereby enriching the utility function of the micro-communication device to satisfy the increasing user demands.

11 Claims, 2 Drawing Sheets

(56) References Cited

U.S. PATENT DOCUMENTS

| | | | | |
|---|---|---|---|---|
| 2006/0108979 A1* | 5/2006 | Daniel | .................. | H01M 2/105 |
| | | | | 320/112 |
| 2007/0071425 A1* | 3/2007 | Horinouchi | ............. | A63F 13/08 |
| | | | | 396/54 |
| 2008/0264701 A1* | 10/2008 | Radtke | ................ | G06F 3/03545 |
| | | | | 178/19.01 |
| 2011/0229119 A1* | 9/2011 | Liang | .................. | H04M 1/0264 |
| | | | | 396/535 |
| 2014/0188423 A1* | 7/2014 | Messinger | ............. | G01B 15/00 |
| | | | | 702/108 |
| 2014/0192462 A1* | 7/2014 | Park | .................... | H04M 1/0262 |
| | | | | 361/679.01 |
| 2015/0075763 A1* | 3/2015 | Kim | .................. | B60H 1/00742 |
| | | | | 165/203 |
| 2015/0356336 A1* | 12/2015 | Hoobler | ................ | G06K 7/089 |
| | | | | 235/455 |
| 2016/0283079 A1* | 9/2016 | Lombardi | ............. | G06F 3/0488 |
| 2017/0140221 A1* | 5/2017 | Ollila | ................ | G06K 9/00604 |
| 2017/0293787 A1* | 10/2017 | Utykanski | .......... | G06K 7/10881 |
| 2018/0060556 A1* | 3/2018 | Fujino | .................... | G06F 21/32 |

* cited by examiner

MEASURABLE MICRO-COMMUNICATION DEVICE

CROSS-REFERENCE TO RELATED APPLICATIONS

This application claims the benefit of priority to Chinese Invention Application No. 201710124869.0, filed Mar. 3, 2017, which is hereby incorporated by reference in its entirety.

FIELD OF THE INVENTION

The invention relates to a micro-communication device, and more particularly to a measurable micro-communication device with measurement function.

BACKGROUND OF THE INVENTION

Current micro-communication devices including smart phones and tablet PC, etc., are equipped with many entertainment functions, such as surfing the Internet, taking pictures and playing games, and the like. Besides, these micro-communication devices are namely equipped with one utility function that is communication. However, for outdoor sports enthusiasts or some people engaged in special industries, such as exploration workers and surveying workers, these micro-communication devices cannot satisfy their measurement demands including distance measurement and temperature measurement. Furthermore, a camera is commonly configured at a back surface of the current micro-communication device, thus the camera operation could only be carried out when the device is picked up, and is failed when the device lies on a flat position.

Therefore, there is a need for providing a micro-communication device with measurement function, and camera operation can be used on a flat position.

SUMMARY OF THE INVENTION

One objective of the present invention is to provide a micro-communication device with measurement function, and the camera operation can be used if the device lies on a flat position.

To achieve the above-mentioned objective, the present invention provides a measurable micro-communication device, which includes a main body, a camera and a measurement sensor, a display screen is provided at a front surface of the main body, and both the camera and the measurement sensor are configured at a top surface of the main body.

In comparison with the prior art, since the camera is configured at the top surface of the main body, thus if the measurable micro-communication device is lain on flat position, user can also take pictures by using the camera, without picking up the device. Thus the camera operation is more convenient. Furthermore, since the measurement sensor is configured at the top surface of the main body, by which distance and temperature can be measured, thereby enriching the utility function of the micro-communication device to satisfy the increasing user demands.

Preferably, the camera is embedded in the top surface of the main body. Thus the camera will not be protruded from the top surface to increase the aesthetics and protect itself.

Preferably, said camera is provided at each end of the top surface of the main body respectively.

Preferably, said camera is provided at one side of the top surface of the main body, and a LED is provided at another side of the top surface of the main body.

Preferably, the measurement sensor is an infrared rangefinder sensor. Thus distance between an object and the device can be measured by transmitting and receiving the infrared light.

Preferably, the measurement sensor is an infrared temperature sensor. Thus temperature of an object can be measured.

Preferably, said measurement sensor is provided at each end of the top surface of the main body respectively, one of the measurement sensors is an infrared rangefinder sensor, and another of the measurement sensors is an infrared temperature sensor.

Preferably, a receiving slot is provided at a bottom surface of the main body.

Preferably, two receiving slots are provided at a bottom surface of the main body, one of the receiving slots is contained with a battery, and another of the receiving slots is contained with a pen.

Preferably, two sides of the main body are cylindrical sides, and the receiving slot is formed in each cylindrical side respectively.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
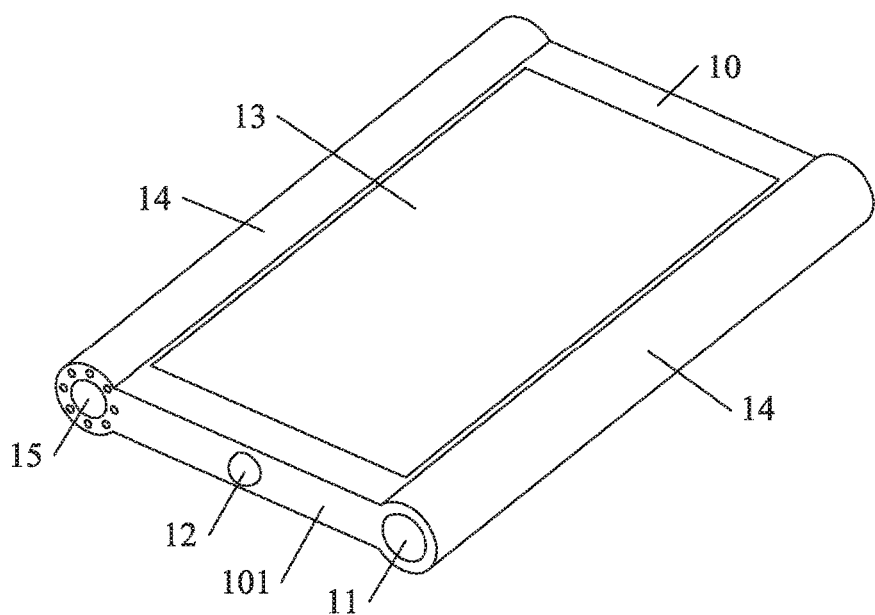
FIG. 1 is a perspective view of a measurable micro-communication device according to the present invention.
Figure 2:
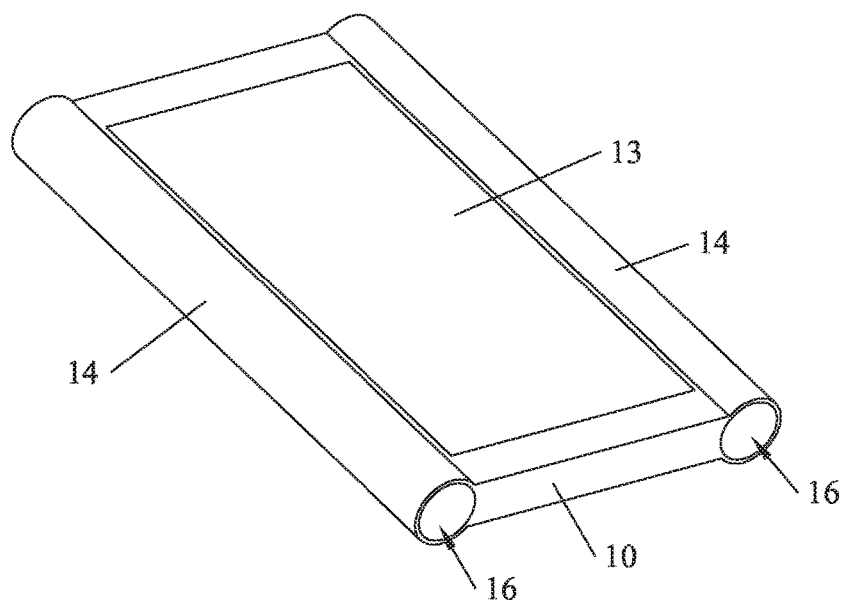
FIG. 2 is another perspective view of a measurable micro-communication device according to the present invention.

As shown in FIGS. 1 and 2, a measurable micro-communication device 1 according to the present invention includes a main body 10, a camera 11 and a measurement sensor 12. A display screen 13 is provided at a front surface of the main body 10, two cylindrical sides 14 are provided at two sides of the main body 10, and the thickness of the sides 14 are larger than that of the middle portion of the main body 10 where is provided with the display screen 13.

The camera 11 is embedded in the top surface 101 of the main body 10. Specifically, the camera 11 is formed on one end of the top surface 101, and a LED 15 is formed on another end of the top surface 101. The LED 15 is served as a flash light for the camera 11, or served as an individual light source. In this embodiment, the camera 11 uses a professional camera with high solution, and the focus of the camera 11 can be adjusted by a slide gesture on the display screen, with the maximum zoom times of 1000. Since both of the camera 11 and the LED 15 are formed in an embedded manner, thus they will not be protruded from the top surface 101 of the main body 10. In such a way, these components can be protected, and the appearance of the measurable micro-communication device 1 is not affected. In other embodiments, the top surface 101 of the main body 10 can be only provided with a single camera 11 but without the LED 15, or provided with two cameras 11 at two ends thereof.

The measurement sensor 12 is configured at the top surface 101 of the main body 101 and located between the camera 11 and the LED 15. In this embodiment, the measurement sensor 12 is an infrared rangefinder sensor. Specifically, an infrared light is transmitted from the transmitting end of the infrared rangefinder sensor, then reflected on the measured object, and received by the receiving end of the infrared rangefinder sensor. In such a way, distance between the object and the device can be measured out. In another embodiment, the measurement sensor 12 is an infrared temperature sensor, thus the device 1 can measurement temperature. In one more embodiment, two measurement sensors 12 are provided at the top surface 101 of the main body 10, one of sensors is an infrared rangefinder sensor, another of sensors is an infrared temperature sensor; under this condition, the device 1 can measurement both of distance and temperature.

Portions of the sides 14 are hollow, and a receiving slot 16 is formed in each side 14, further, the opening of the receiving slot 16 faces the lower side of the device 1. The two receiving slots 16 are contained with a battery and a pen respectively, which makes the battery and the pen portable. The battery can be removed to supply other device, and the user may use the pen anytime and anywhere. Of course, the amount of the receiving slot 16 can be one, and the user may fill other articles therein.

In this present embodiment, the measurable micro-communication device 1 is a smart phone, and can be a tablet PC or other electronic devices in other embodiments.

By comparison with the prior arts, since the camera 11 is configured at the top surface 101 of the main body 10, thus if the measurable micro-communication device 1 is lain on the table, user can also take pictures by using the camera 11, without picking up the device 1. Thus the camera operation is more convenient. Furthermore, since the measurement sensor 12 is configured at the top surface 101 of the main body 10, by which distance and temperature can be measured, thereby enriching the utility function of the micro-communication device 1 to satisfy the increasing user demands.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A measurable micro-communication device, comprising a main body, a camera and a measurement sensor, a display screen being provided at a front surface of the main body, both the camera and the measurement sensor being configured at a top surface of the main body, the main body having a middle portion and two sides that are thicker than the middle portion, and a receiving space being formed between the two sides and the display screen being located between the two sides, wherein the camera is embedded in the top surface of one of the two sides of the main body.

2. The measurable micro-communication device according to claim 1, further comprising another camera, wherein said camera and said another camera are provided at two ends of the top surface of the main body respectively.

3. The measurable micro-communication device according to claim 1, wherein said camera is provided at one side of the top surface of the main body, and a LED is provided at another side of the top surface of the main body.

4. The measurable micro-communication device according to claim 1, wherein the measurement sensor is an infrared rangefinder sensor.

5. The measurable micro-communication device according to claim 1, wherein the measurement sensor is an infrared temperature sensor.

6. The measurable micro-communication device according to claim 1, wherein said measurement sensor comprises an infrared rangefinder sensor and an infrared temperature sensor, which are configured at the top surface of the main body.

7. The measurable micro-communication device according to claim 1, wherein a receiving slot is provided at a bottom surface of the main body.

8. The measurable micro-communication device according to claim 7, wherein two receiving slots are provided at a bottom surface of the main body, one of the receiving slots is contained with a battery, and another of the receiving slots is contained with a pen.

9. The measurable micro-communication device according to claim 8, wherein two sides of the main body are cylindrical sides, and the receiving slot is formed in each cylindrical side respectively.

10. The measurable micro-communication device according to claim 1, wherein the measurable micro-communication device is a smart phone or a tablet personal computer (PC).

11. The measurable micro-communication device according to claim 1, wherein a focus of the camera can be adjusted by a slide gesture on the display screen.

* * * * *